Figure 3:
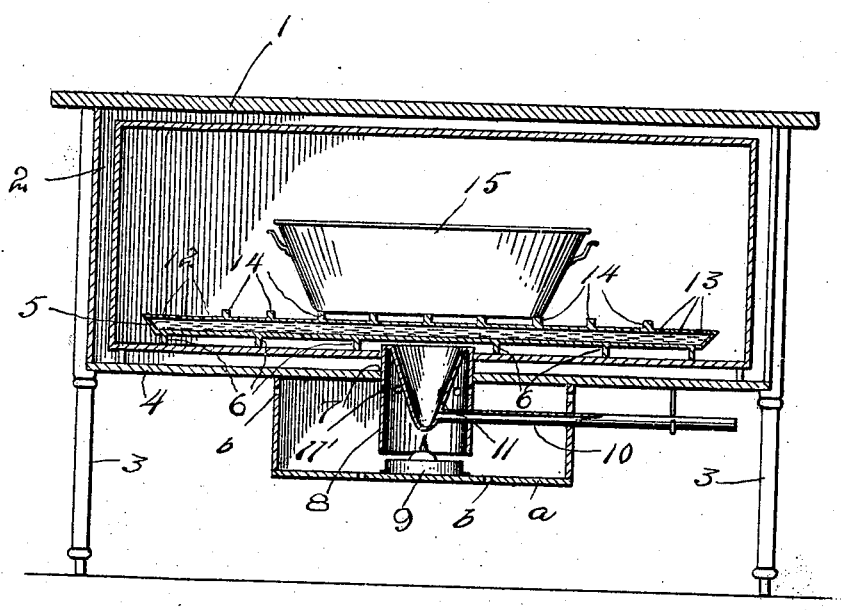

No. 847,020. PATENTED MAR. 12, 1907.
F. McDONALD.
DOUGH RAISER.
APPLICATION FILED AUG. 9, 1905.
2 SHEETS—SHEET 1.
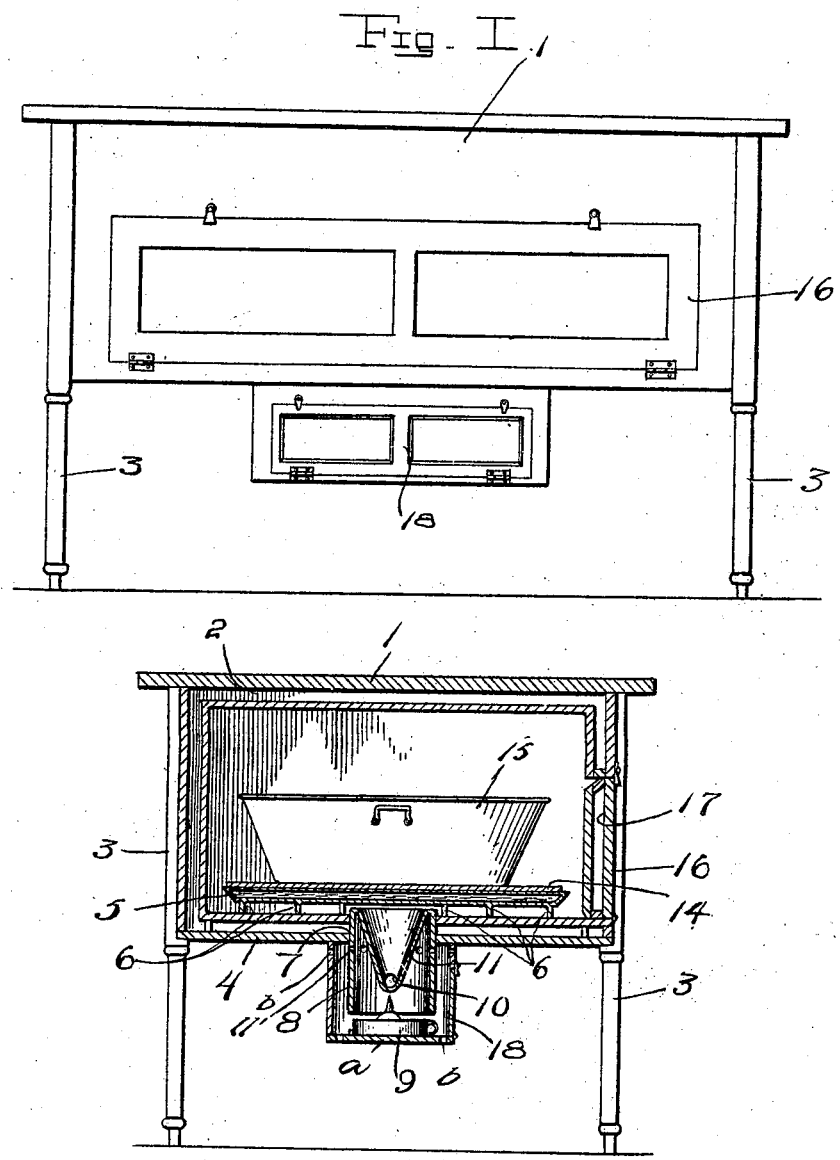

No. 847,020. PATENTED MAR. 12, 1907.
F. McDONALD.
DOUGH RAISER.
APPLICATION FILED AUG. 9, 1905.

2 SHEETS—SHEET 2.

Witnesses
J. C. Simpson
E. M. Oulford

Inventor
French McDonald

By Chandlee & Chandlee
Attorneys

UNITED STATES PATENT OFFICE.

FRENCH McDONALD, OF HIAWATHA, KANSAS.

DOUGH-RAISER.

No. 847,020.  Specification of Letters Patent.  Patented March 12, 1907.

Application filed August 9, 1905. Serial No. 273,402.

*To all whom it may concern:*

Be it known that I, FRENCH McDONALD, a citizen of the United States, residing at Hiawatha, in the county of Brown, State of Kansas, have invented certain new and useful Improvements in Dough-Raisers; and I do hereby declare the following to be a full, clear, and exact description of the invention, such as will enable others skilled in the art to which it appertains to make and use the same.

This invention relates to dough-raisers.

One object of the invention is to provide a simple, inexpensive, durable, and efficient oven for the raising of bread material.

Another object of the invention resides in the provision of an oven for dough-raising or food-warming purposes.

With these and other objects in view the present invention consists in the combination and arrangement of parts, as will be hereinafter more fully described, shown in the accompanying drawings, and more particularly pointed out in the appended claims, it being understood that changes in the form, proportion, size, and minor details may be made within the scope of the claims without departing from the spirit or sacrificing any of the advantages of the present invention.

In the drawings, Figure 1 is a front elevation of my invention. Fig. 2 is a transverse sectional view, and Fig. 3 is a longitudinal sectional view.

Referring now more particularly to the accompanying drawings, the reference character 1 designates an oven having an inner spaced wall 2, forming a chamber therebetween, and the oven-walls 1 to insure the retention of an even distribution of the heat within the oven. This oven may be formed of wood or any other suitable material and is mounted upon suitable legs 3.

Disposed upon the bottom 4 of the oven is a water-pan 5, having suitable legs 6 to hold the water-pan in spaced relation with respect to the bottom of the oven. It will be seen that the pan 5 is disposed immediately over the opening 7, formed in the bottom of the oven, through which is passed the upper end of a casing 8, which has an inverted-cone-shaped member 11 depending thereinto and its lower end open. It will be seen that this opening 7 is arranged centrally of the bottom of the oven and that an air-supply pipe 10 pierces the casing 8 and communicates with the inverted-cone-shaped member 11, whose upper end is open and terminating evenly with the upper edge of the casing. It will thus be seen that the atmospheric air in its passage through the pipe 10 and inverted-cone-shaped member 11 is heated before its passage into the oven. It will also be understood that heat from the flame of the lamp 9 passes upwardly between the walls of the cylindrical casing 8 and cone-shaped member 11 and through the perforation 11' into a second casing $a$, having perforations $b$. Now since the cone-shaped member 11 and casing 8 are disposed immediately beneath the water-pan 5 and centrally thereof the latter serves to spread the heat, so that it will not contact directly with the bottom of the dough-receptacle 15. This water-pan is provided with perforations 12 and 13 at each end, through which the vapors of condensation may exude, the moisture arising from such vaporization of the water preventing a hard thin crust from forming on the dough. Such formation, of course, greatly hinders the fermentation process, and therefore the water-pan is an essential feature of my invention. It will be observed that the dough-receptacle 15 does not rest directly upon the water-pan 5, but upon the transverse cleats 14, arranged upon the latter.

In order that access may be had to the oven, I provide a hinged door 16 in one side of the oven, which door is provided with a double wall 17 to form a space between its walls corresponding to the space formed between the double walls of the oven. Of course the double-wall feature may be eliminated from the structure, if desired.

It will be understood that the heater comprises a lamp 9, cylindrical casing 8, and also the outer casing $a$ and that the heater is arranged immediately beneath the oven with the upper end of the inner casing 8 protruding through the bottom of the latter and terminating immediately short of the water-pan 5. Air is permitted to enter the outer casing $a$ through the side and bottom perforations $b$. In order to light or put out the lamp or to insert or remove the latter from the casing $a$, I provide the casing $a$ with a hinged door 18.

My invention is adapted not only for the raising of dough, but may be equally applicable for use in the heating of milk for souring purposes, or for the heating and warming of foods, or for any other analogous purpose.

What is claimed is—

1. A device of the class described comprising a major casing, a support located within the casing, a minor casing disposed beneath the first-named casing, a cylindrical member located partly within the minor casing and partly within the major casing and extending through the floor of the latter casing, and a heater located within the minor casing and beneath the said cylindrical member.

2. A device of the class described comprising a casing, a support arranged within the casing, a cylindrical casing opening through the floor of said first-named casing and having an inner inverted conical portion, a pipe communicating with said inverted conical portion, and a heater disposed beneath the casing and said conical portion thereof.

3. A device of the class described comprising a casing, a cylindrical member extending through the floor of the casing, a support arranged within the casing above the said member, said cylindrical member including a closed inner inverted conical portion, a burner located beneath the cylindrical member and its said portion and means for admitting air to the said inverted conical portion.

4. A device of the class described comprising a casing, a support located within the casing, a cylindrical member extending through the floor of the casing and beneath the support, said member being closed at its upper end and having its lower end open, means for introducing air into the member, and means located beneath the open end of the member for heating the air introduced thereinto.

5. A device of the class described comprising a casing, a support located within the casing, a cylindrical member extending through the floor of the casing and including an integral depending inverted conical portion located therewithin, a pipe communicating with the said inverted conical portion and means for heating the said portion.

6. A device of the class described comprising a casing, a support located within the casing, a cylindrical member extending through the floor of the casing, said cylindrical member including an integral inverted conical portion closing one end of the said member and located therewithin, a pipe communicating with the said inverted conical portion, and means for heating said portion.

In testimony whereof I affix my signature in presence of two witnesses.

FRENCH McDONALD.

Witnesses:
 EDGAR M. WEGAND,
 SAMPLE F. NEWLON.